United States Patent
Nies

(10) Patent No.: US 6,509,039 B1
(45) Date of Patent: Jan. 21, 2003

(54) CROSSLINKED PRODUCTS OF BIOPOLYMERS CONTAINING AMINO GROUPS

(75) Inventor: Berthold Nies, Fränkisch-Crumbach (DE)

(73) Assignee: Merck Patent Gesellschaft, Darmstadt (DE)

( * ) Notice: Subject to any disclaimer, the term of this patent is extended or adjusted under 35 U.S.C. 154(b) by 0 days.

(21) Appl. No.: 09/621,343

(22) Filed: Jul. 21, 2000

Related U.S. Application Data

(63) Continuation of application No. 09/125,072, filed as application No. PCT/EP97/00364 on Jan. 28, 1997, now abandoned.

(30) Foreign Application Priority Data

Feb. 9, 1996 (DE) .......................... 196 04 706

(51) Int. Cl.[7] ............................................. A61K 31/722
(52) U.S. Cl. ...................... 424/488; 424/422; 424/423; 424/447; 424/451; 424/479; 424/484; 514/55; 536/20
(58) Field of Search ....................... 514/2, 55; 424/484, 424/488, 422, 423, 447, 451, 479; 536/20

(56) References Cited

U.S. PATENT DOCUMENTS

| | | | |
|---|---|---|---|
| 3,296,155 A | 1/1967 | Mink ........................... | 260/8 |
| 4,808,313 A | * 2/1989 | Michizuki et al. ..... | 210/500.28 |
| 5,201,945 A | * 4/1993 | Shimizu et al. ............. | 106/203 |
| 5,874,551 A | * 2/1999 | Glasser et al. ................ | 536/20 |

FOREIGN PATENT DOCUMENTS

DE 4034871 7/1992

OTHER PUBLICATIONS

File caplus on Stn. An No. 1994:486143. Baba, Yoshimi, Modified Chitosans, Their Prepartion and Uses, JP 05331204, Dec. 14, 19993. Abstract Only.*

File Caplus on Stn. An. No. 1994:227002. Myazaki et al. Sustained Release Pharmaceutical Suspensions Containing Crosslinked Chitosan. JP 05339149, Dec. 21, 1993. Abstract only.*

Chemical Abstracts (1990), vol. 112, No. 24 Abstract No. 223161.

* cited by examiner

Primary Examiner—Gabrielle Bugaisky
Assistant Examiner—Anish Gupta
(74) Attorney, Agent, or Firm—Millen, White, Zelano & Branigan P.C.

(57) ABSTRACT

The invention relates to cross linked products of chitosan or gelatin and of a carboxylic acid di- or polyanhydride. These products form hydrogels with a wide variety of applications, preferably in the medical/pharmaceutical sector.

12 Claims, No Drawings

CROSSLINKED PRODUCTS OF BIOPOLYMERS CONTAINING AMINO GROUPS

This is a continuation, of application Ser. No. 09/125,072 filed Aug. 7, 1998, now abandoned.

The invention relates to cross linked products of biopolymers containing amino groups and of a carboxylic acid di- or polyanhydride such as pyromellitic anhydride or polymaleic anhydride. The biopolymers containing amino groups mean, in particular, chitosan and gelatin.

Chitosan is a cationic biopolymer consisting of repeating units of 1,4-linked D-glucosamine. Chitosan is the product of the deacetylation of chitin which is widespread in animate nature as a structural substance in the carapace and shells of crustaceans, insects and the like. Chitosan, as a natural raw material which is obtainable in a straightforward and environmentally compatible manner from natural renewable sources, is increasingly attracting interest for industrial applications. An essential property of chitosan is the ability to form viscous aqueous solutions. Solutions of this type can have a wide variety of applications in chemistry, pharmacy, cosmetics and food technology. Examples thereof include use as a thickener, gel former, binder, film former and adhesive. Chitosan is also used as a naturally degradable flocculation aid for purification of waste water. The property of binding heavy metals is also beneficial for the same application purpose. Chitosan, as a biocompatible and bioabsorbable polymer, is of particular interest in pharmaceutical and medical applications such as, for example, as a component of wound coverings or of materials for endoprostheses.

However, the specific solubility characteristics of chitosan set limits to practical use. The only suitable aqueous media for dissolving chitosan are monobasic mineral acids such as hydrochloric acid, and aqueous solutions of some organic acids such as, for example, acetic acid and lactic acid. Chitosan is virtually insoluble in other media and conventional solvents. Chitosan solutions can accordingly be employed only where the aqueous acidic dissolving medium is not a problem. The adjustment of particular viscosities is essentially possible only via the concentration of chitosan in the solution. Highly viscous solutions or gels can be obtained only by choosing an appropriately high chitosan concentration which is, on the one hand, difficult and, on the other hand, in turn unwanted or disadvantageous for many applications. It is desirable to have high viscosities in the case of solutions, and gels with a stable consistency at a comparatively low chitosan concentration.

Gelatin is a polypeptide obtained from skin or bone of animal origin by acidic or alkaline hydrolysis. Gelatin swells in water and then dissolves therein to give a viscous solution which, however, solidifies to a gel at concentrations above about 1% by weight. Gelatin likewise has a wide variety of uses analogous to those already described above for chitosan.

The chemical modification of gelatin via the amino groups therein is known, such as, for example, crosslinking with the aid of aldehydes such as formaldehyde, glutaraldehyde or succinaldehyde. The use of aldehydes such as, in particular, formaldehyde is now no longer tolerable for environmental protection and health reasons. It is now no longer possible to employ corresponding cross linked products of gelatin for medical/pharmaceutical or food technology purposes.

The crosslinking of gelatin with di or polycarboxylic acids or derivatives thereof is known (for example from EP 0 183 365). However, this method has the disadvantage that the hydrophilic characteristics of the gelatin cross linked in this way are reduced so that hydrogels can no longer be prepared therefrom.

It has now been found that chitosan or gelatin can be reacted with a carboxylic acid di- or polyanhydride to give cross linked products in the form of gels.

The invention thus relates to cross linked products of chitosan or gelatin and a carboxylic acid di- or polyanhydride.

The invention also relates to a process for preparing cross linked products of this type, wherein chitosan or gelatin is reacted with a carboxylic acid di- or polyanhydride.

Particularly suitable crosslinking reagents for chitosan or gelatin are carboxylic acid dianhydrides such as, for example, pyromellitic anhydride, and carboxylic acid polyanhydrides such as, for example, polymaleic anhydride. Compounds of this type are known and are available without difficulty. Oligomeric and polymeric maleic anhydride can be obtained by free-radical polymerization of maleic anhydride. A polymaleic anhydride with a molecular weight of up to 1000 is preferred. It is also possible to employ cooligomers or copolymers of maleic anhydride with other vinylic monomers as long as these contain at least two anhydride groups in the molecule.

Chitosan can be used in any desired and commercially available form in the process according to the invention. The characteristic features of the chitosan to be employed can be varied within a wide range; they depend, in particular, on the molecular weight and degree of deacetylation.

Analogous statements apply to gelatin to be employed correspondingly.

The crosslinking is based on the reaction of free amino groups in chitosan or gelatin with anhydride groups in the abovementioned crosslinking reagents. This entails in each case an acid equivalent of the anhydride group forming an amide linkage with an amino group of a glucosamine unit in the chitosan or with an amino group of an amino acid unit in the gelatin, while the second acid equivalent is converted into a free carboxylic acid group. Since the crosslinking reagents have at least two anhydride groups per molecule it is possible for a linkage to be formed between different polymer chains of chitosan or gelatin, that is to say a crosslinking. The free carboxyl groups introduced into the polymer assemblage as a consequence of the crosslinking increase the hydrophilic characteristics of the cross linked product, which is evident in particular from the water-absorption capacity, the swellability with water and the formation of hydrogels. Chitosan or gelatin and crosslinking reagent can be reacted together in substantially any ratio. A possible practical limit to the ratio exists in the case of an equivalent number of free amino groups in chitosan or gelatin and anhydride groups in the crosslinking reagent. The properties of the resulting cross linked products are essentially determined by the degree of crosslinking and hydrophilicity via this ratio and can be adjusted appropriately.

The reaction between chitosan or gelatin and crosslinking reagent can be carried out without difficulty and, in particular, under mild conditions. For this purpose, chitosan or gelatin is first dissolved in a solvent suitable for this. A solution of chitosan in dilute aqueous acetic acid is preferred. Gelatin is preferably introduced in the form of an aqueous solution. Then a solution of the carboxylic acid di- or polyanhydride is added to this solution. A suitable and preferred solvent for this purpose is acetone. The crosslinking reaction starts essentially spontaneously. Adequate reaction conditions are temperatures between room temperature and 100° C., and atmospheric pressure. The progress of the reaction is shown by the formation of a gel. After the reaction is complete, the organic solvents can be removed by washing with water, and the cross linked product can be obtained as a stable hydrogel. It is possible straightforwardly to remove the water content from the latter and, if required, to reconstitute the hydrogel by renewed addition of water.

The cross linked product of chitosan or gelatin according to the invention can be employed in a variety of ways, both in the form of gels and in dry form. Thus, for example, it is possible to produce therefrom powders which bind water or moisture, also shaped articles, sheets, membranes, threads and fabrics, and coatings on a wide variety of substrates. In the medical/pharmaceutical sector, it is likewise suitable, for example, as a material for medicine capsules. The particular biocompatibility and bioabsorbability of the material form the basis of its suitability as a matrix material for implantable medicine carriers, also as a material for implants or other surgical aids such as, for example, suture materials or wound coverings. The presence of free carboxyl groups in the cross linked product provides the opportunity for further chemical modification of the material.

EXAMPLE 1

10 g of chitosan with a degree of deacetylation of 87% and an average molecular weight of 300,000 are dissolved in 1% aqueous acetic acid to give a 3% solution. Acetone is slowly added to this solution while stirring continuously until the solution contains about 30% acetone. Subsequently, 5 ml of a 5% solution of polymaleic anhydride with a molecular weight of about 1000 in acetone are added to this solution. Gel formation starts after about 3 minutes and is complete after about 2 h. The entire reaction takes place at room temperature. The organic solvents are removed by washing several times with water and heating to 60° C. A stable hydrogel is obtained.

EXAMPLE 2

The procedure is as in Example 1but using pyromellitic dianhydride.

EXAMPLE 3

Pharmaceutical gelatin is converted into a 5% aqueous solution with gentle heating (~40° C.). After cooling to 20° C., 60 ml of acetone are added with stirring to 100 ml of this solution. Subsequently, 3 ml of a 5% solution of pyromellitic dianhydride in acetone are added to this solution. Extensive gel formation starts after about 3 minutes and is complete after about 20 minutes. The organic solvents are removed by washing several times with water and heating to 60° C. A stable hydrogel is obtained.

EXAMPLE 4

The procedure is as in Example 3 but using pyromellitic dianhydride [sic].

I claim:

1. In a pharmaceutical composition comprising an active ingredient and a pharmaceutically acceptable carrier, the improvement wherein the carrier comprises a cross linked product of chitosan obtained by reacting chitosan with a carboxylic acid dianhydride or carboxylic acid polyanhydride.

2. The pharmaceutical composition according to claim 1, wherein the cross linked product of chitosan is obtained by reacting chitosan with pyromellitic anhydride.

3. The pharmaceutical composition according to claim 1, wherein the cross linked product of chitosan is obtained by reacting chitosan with a polymaleic anhydride.

4. The pharmaceutical composition according to claim 1, wherein the chitosan which is reacted with a carboxylic acid di- or polyanhydride is in a solution of acetic acid in aqueous acetone.

5. The pharmaceutical composition according to claim 4, wherein the chitosan is reacted with pyromellitic dianhydride.

6. The pharmaceutical composition according to claim 4, wherein the chitosan is reacted with polymaleic anhydride.

7. The pharmaceutical composition according to claim 3, wherein the polymaleic anhydride has a molecular weight of up to 1000.

8. The pharmaceutical composition according to claim 6, wherein the polymaleic anhydride has a molecular weight of up to 1000.

9. In a pharmaceutical capsule comprising an active ingredient and a support material, the improvement wherein the support material comprises a cross linked product of chitosan, obtained by reacting chitosan with a carboxylic acid dianhydride or carboxylic acid polyanhydride.

10. In a medical implant, the improvement wherein the implant comprises a cross linked product of chitosan, obtained by reacting chitosan with a carboxylic acid dianhydride or carboxylic acid polyanhydride.

11. In a suture material, the improvement wherein the suture material comprises a cross linked product of chitosan, obtained by reacting chitosan with a carboxylic acid dianhydride or carboxylic acid polyanhydride.

12. In a wound covering, the improvement wherein the wound covering comprises a cross linked product of chitosan, obtained by reacting chitosan with a carboxylic acid dianhydride or carboxylic acid polyanhydride.

* * * * *

UNITED STATES PATENT AND TRADEMARK OFFICE
CERTIFICATE OF CORRECTION

PATENT NO.     : 6,509,039 B1
DATED          : July 21, 2000
INVENTOR(S)    : Berthold Nies et al.

It is certified that error appears in the above-identified patent and that said Letters Patent is hereby corrected as shown below:

<u>Title page,</u>
Item [75], Inventors, after "Berthold Nies, Fränkisch-Crumbach (DE)" insert -- , and Wolfgang Ritter, Offstein (DE) --

Signed and Sealed this

Second Day of December, 2003

JAMES E. ROGAN
*Director of the United States Patent and Trademark Office*